United States Patent [19]
Tyutinman

[11] Patent Number: 5,288,060
[45] Date of Patent: Feb. 22, 1994

[54] SHOCK ABSORBING SUSPENSION

[76] Inventor: Adolf Tyutinman, 2983 Cambridge Dr., San Jose, Calif. 95125

[21] Appl. No.: 11,299

[22] Filed: Jan. 28, 1993

[51] Int. Cl.⁵ .............................................. F16F 1/14
[52] U.S. Cl. .................................... 267/154; 267/136; 52/167 RM; 248/584
[58] Field of Search ....................... 267/154, 136, 273; 52/167 R, 167 RM, 167 CB; 248/580, 584, 590; 280/688, 721

[56] References Cited

U.S. PATENT DOCUMENTS

| | | | |
|---|---|---|---|
| 3,025,032 | 3/1962 | Leja | 248/590 |
| 3,347,002 | 10/1967 | Penkuhn | 52/167 RM |
| 3,794,277 | 2/1974 | Smedley et al. | 52/167 RM X |
| 3,795,392 | 3/1974 | Nemec | 267/154 X |
| 4,235,317 | 11/1980 | Maciejewski | 188/268 |
| 5,016,911 | 5/1991 | Takehara et al. | 280/708 |
| 5,103,605 | 4/1992 | Sul | 52/167 |
| 5,134,818 | 8/1992 | Van Parera | 52/167 |
| 5,233,797 | 8/1993 | Uno et al. | 52/167 RM X |

FOREIGN PATENT DOCUMENTS

4-34188  2/1992  Japan ................. 52/167 R

Primary Examiner—Robert J. Oberleitner
Assistant Examiner—Lee Young

[57] ABSTRACT

A shock absorbing suspension comprises a pair of parallel, spaced mounting plates (12), two pairs of counterrotating D-frames (13), and two connecting bars (11). Each pair of frames is slidably attached to the inner side of one of the mounting plates by two grippers (14). The scissoring connecting bars are disposed between the pairs of frames to link the frames together. A resistance mechanism (65) is mounted on each gripper for substantially resisting the rotation of each individual frame in one direction only, such that the suspension will substantially resist being compacted together, but can be freely extended apart. In one application, the bottom mounting plate is attached to the ground, while the top mounting plate is attached to and supports a building. When at rest, the resistance mechanisms will provide enough resistance to allow the suspension to support the building without being compacted. When the ground jolts upwardly in an earthquake, the suspension will be compacted to absorb the upward motion of the ground. But, when the ground jolts downwardly, the suspension will freely extend. As a result, the suspension will safely isolate the building from the violent ground movements.

22 Claims, 5 Drawing Sheets

SHOCK ABSORBING SUSPENSION

FIELD OF THE INVENTION

This invention relates generally to energy absorbing devices, specifically to a shock absorbing suspension suitable for use in a wide variety of applications.

BACKGROUND OF THE INVENTION

The cabins of moving automobiles need to be isolated from the jarring movements of their wheels, so that they will remain relatively stable even though the wheels are jarred by road irregularities. Buildings located in dangerous earthquake areas such as California and Japan are subject to destructive ground movements. Therefore, it would be desirable if the buildings could be made to remain stable and upright even though the ground beneath them jolts in different directions. As a result, a variety of suspensions and shock absorbers have been designed to meet these needs.

Most motor vehicle suspensions share a common configuration. U.S. Pat. No. 5,016,911 to Takehara et al. (1991) shows a typical motor vehicle suspension. It consists of an arm for locating the wheel relative to the vehicle body, a spring for supporting the weight of the body and absorbing the energy imparted to the wheel by the road, and a damping strut for dampening the motions of the wheel. Although widely used, this configuration requires separate locating, energy absorbing, and damping components. In addition, the pivot arm causes the wheel to move up and down along an arc, so that the tire cannot maintain optimum contact with the road surface. Furthermore, the suspension travel is quite short, so that it is inadequate for fully absorbing the effects of very large bumps and pot holes.

A greater variety of designs exist for building shock absorbers. U.S. Pat. No. 5,134,818 to Parera (1992) shows a shock absorber comprising a number of vertical spring rods arranged in a cylinder embedded in the foundation. The rods support the weight of the building, which compresses the rods so that they bow radially outwardly. When the ground moves downwardly during an earthquake, the rods will extend slightly as they straighten so that they maintain the stability of the building. However, this device has very limited travel, mainly in the vertical direction, so that it is capable of absorbing only very minor ground movements, and is not very effective for the main type of earthquake movement, which is horizontal.

U.S. Pat. No. 5,103,605 to Sul (1992) shows another building shock absorber comprising a number of coil springs for supporting a building and isolating it from vertical and lateral ground displacements. The springs are mounted in a box slidably disposed on a pan. The pan is attached to the ground, so that when the ground jolts laterally during an earthquake, the pan will be free to slide about horizontally under the box, so that the building will remain stationary. Relatively large vertical ground displacements can be absorbed by the long coil springs. However, this device lacks a damping mechanism, so that the springs can allow the building to oscillate even after the ground movements subside.

Another type of building shock absorber is shown in U.S. Pat. No. 4,235,317 to Maciejewski (1980). It comprises a series of telescoping tubes with spring loaded sealing gaskets. The tubes are filled with an energy absorbing medium for absorbing the energy of very strong shocks. Because of the telescoping design, this device can absorb large displacement vibrations. However, it is much like the damping strut commonly used in motor vehicles, so that it cannot support the static weight of an object by itself. Therefore, it must be used in conjunction with other mechanisms such as locating arms, springs, etc.

In conclusion, conventional motor vehicles suspensions offer limited travel, so that they are unable to absorb large irregularities on road surfaces. They also cause the wheels to move in vertical arcs, such that the tires cannot maintain optimum contact with the road. Furthermore, they require separate components for locating the wheels, absorbing impacts, and dampening vibrations. Existing building shock absorber designs either offer very limited travel, so that they can only absorb minor quakes, cannot absorb horizontal shocks, or lack damping mechanisms to prevent continued oscillations of the building after the end of an earthquake.

SUMMARY OF THE INVENTION

Accordingly, a primary object of the invention is to provide an improved shock absorbing suspension. Additional objects and advantages are to provide a shock absorbing suspension which can support the weight of an object above a supporting surface, which extends and contracts in a linear direction, which can isolate the object from small as well as very large displacements of the supporting surface, which can isolate the object from lateral as well as vertical displacements of the supporting surface, which singularly performs the functions of locating the supported object, absorbing the energy of the moving supporting surface, and dampening vibrations, which can be made to support a variety of objects of different sizes, weight, and in a variety of applications.

Further objectives and advantages will become apparent from a study of the following description and the accompanying drawings.

In a preferred embodiment of the invention, a shock absorbing suspension comprises a pair of widely spaced, rectangular mounting plates. One of the plates is attached to the supporting surface or object such as a building foundation or a wheel of a motor vehicle, while the other is attached to the object to be supported such as a building or the body of a motor vehicle, respectively. The supported object is thus located by the suspension relative to the supporting surface. Two pairs of semi-circular frames are located between the plates. The semi-circular frames of each pair are rotatably connected together at the axes of the frames. Each pair of frames are attached to the plates by grippers and rollers which slidably hold the frames along their curved portions, such that the frames are free to rotate about their axes. A pair of connecting bars, which are rotatably connected at their center portions so that they form a cross, connect opposite corners of the opposing pairs of semi-circular frames. The combination of semi-circular frames and connecting bars move in a scissors-like fashion to allow the mounting plates to be moved far apart or close together. Resistance devices located on the grippers cause each of the semi-circular frames to resist rotation in one predetermined direction only. As such, the suspension will resist being compacted or compressed upwardly by the supporting surface or object to act as a shock absorber and damper, while it will freely extend to allow the supporting surface or object to fall downwardly away.

When used on a motor vehicle, the shock absorbing suspension acts to locate each wheel relative to the body of the vehicle. Because it resists being compacted, it will support the weight of the vehicle when it is at rest. When the vehicle is in motion, and the wheel encounters a bump, the suspension will absorb the energy imparted to the wheel by the bump and dampen any oscillations. As the wheel travels over and away from the bump, the wheel will be caused by gravity to fall downwardly such that suspension will extend back to its initial position.

The shock absorbing suspension may be used in a wide variety of applications. In addition to being used as a suspension for motor vehicles, it may also be used, for example, to isolate buildings and boat cabins from the motions of the ground and sea, respectively.

DETAILED DESCRIPTION

Figure 1A:
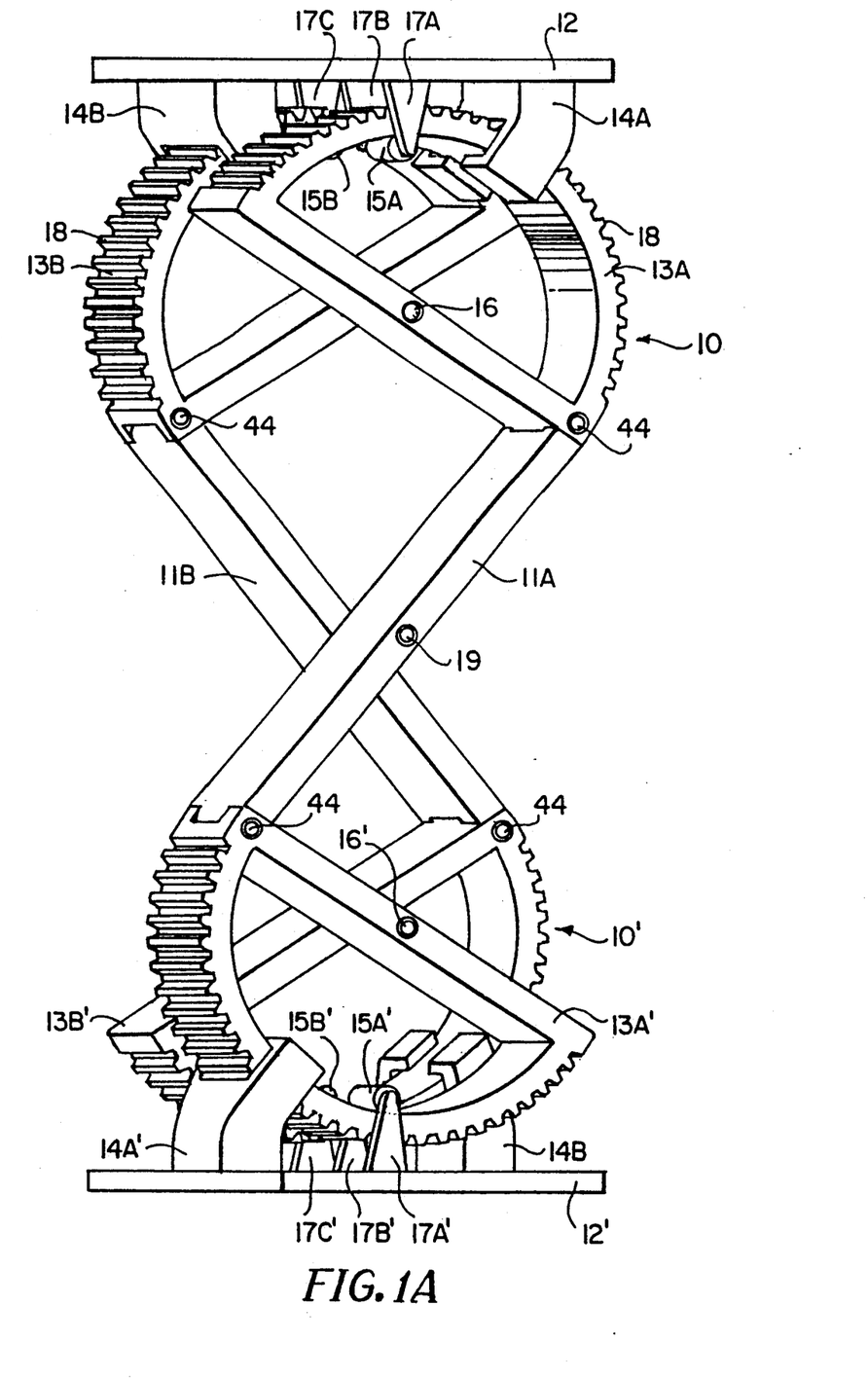
FIG. 1A is a front perspective view of a shock absorbing suspension in accordance with a preferred embodiment of the invention.

In accordance with a preferred embodiment of the invention shown in FIG. 1A, a shock absorbing suspension comprises an assembly 10 positioned at the top of the suspension, an assembly 10' positioned at the bottom of the suspension, and connecting bars 11A and 11B interconnecting assemblies 10 and 10'. Assembly 10' is an identical but inverted copy of assembly 10. The assemblies can be compacted close together or extended far apart.

Assembly 10 comprises a mounting plate 12, a pair of semi-circular frame or D-frames 13A and 13B, a pair of grippers 14A and 14B, and a pair of rollers 15A and 15B. D-frames 13A and 13B are both in the shape of an extruded "D". On the outer surfaces of their curved sides are formed saw teeth 18, which on D-frame 13A are pointed counterclockwise (CCW), but clockwise (CW) on D-frame 13B. The frames form parts of imaginary circles which are concentric about a common axis. The frames are rotatably attached together by an axle 16 which extends through the straight sides of each "D" of the frames. D-frames 13A and 13B are movably held under plate 12, with their curved sides toward the plate, by inwardly curving grippers 14A and 14B, respectively, attached at the outer corners of plate 12. Plate 12 is also connected to the lowest sides of the frames by rollers 15A and 15B. The rollers are connected to plate 12 by arms 17A, 17B, and 17C, which will be explained later in connection with FIG. 1F.

Assembly 10' have components which are compliments of those in assembly 10, specifically mounting plate 12', D-frames 13A', 13B', axle 16', grippers 14A' and 14B', rollers 15A' and 15B', and arms 17A', 17B', and 17C'. Assembly 10' is connected to assembly 10 by connecting bars 11A and 11B. The bars are pivotally connected at their mid points by an axle 19. the upper and lower distal ends of connecting bar 11A are hingably connected to the right and left corners of D-frames 13A and 13A', respectively, by two pivots 44. The upper and lower distal ends of bar 11B are hingably connected to the left and right corners of D-frames 13B and 13B', respectively, by two additional pivots 44.

Figure 1B:
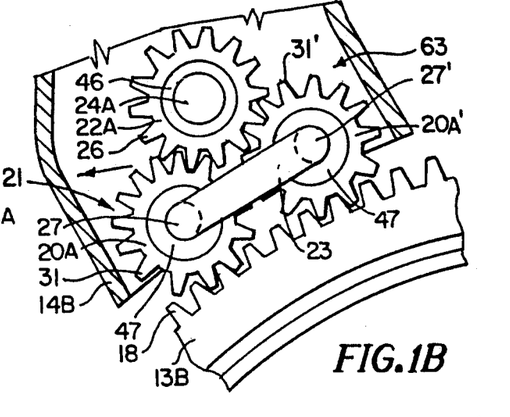
FIG. 1B is a front cutaway view of a gripper used in the suspension of FIG. 1A.

As shown in FIG. 1B, the external surface of the curved portion of D-frame 13B is shaped as tooth 18. Transmission mechanism 63, includes bogie 21 and one or more tooth rollers 22A. Bogie 21, which is carried by the curved portion of D-frame 13B, has two or more transmission elements 20A, which are mounted onto a rigid frame 23. Transmission element 20A has tooth 31 similar to tooth 18. Tooth roller 22A has tooth 26 identical to tooth 31.

Having a constant load when the suspension is in a static loaded condition, tooth roller 22A on lean transmission elements 20A and 20A', it tends to turn transmission elements 20A and 20A' in CW and CCW directions, respectively. Tooth roller 22A has a small tendency to move in direction indicated by an arrow (upward) that is, it tends to rotate in CCW direction. But because they tend to rotate in opposite directions, and because the suspension is in static constrained position, they cannot rotate since they are constrained by teeth 18 and thus they keep tooth roller 22A from rotating. When suspension receiving an increased compression, D-frame 13B rotating in CW direction. Tooth 18 moving teeth 31 of transmission elements 20A thus rotating transmission elements 20A and 20A' in CCW direction. In their turn, teeth 31, overcoming the tendency of tooth roller 22A to rotate in CCW direction, moving teeth 26 of tooth roller 22A in CW direction. As soon as the compression stops increasing, the system returns to the condition described in the paragraph above.

If the regular pressure suddenly drops, the suspension extending, that is, the D-frame 13B rotating in CCW direction. It forces transmission elements 20A to rotate in CW direction, while transmission elements 20A force tooth roller 22 to rotate in CCW direction that is in the direction in which tooth roller 22A tends to rotate itself. When the pressure stops dropping, that is the suspension stops extending and experiencing a regular load, this system stops and returns to the condition described in the second paragraph of FIG. 1B description.

Figure 1C:
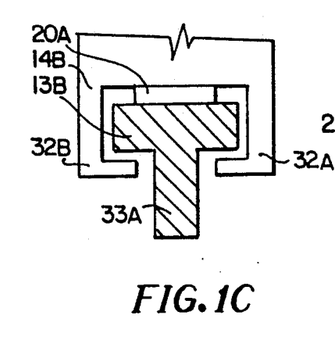
FIG. 1C is a partial right side sectional view of a D-frame used in the suspension of FIG. 1B.

As shown in FIG. 1C, gripper 14B and D-frame 13B are shown in a right side partial sectional view. Gripper 14B has a pair of integral, downwardly extending, L-shaped brackets 32A and 32B for partially surrounding D-frame 13B. A tooth of transmission element 20A is shown in engagement with the top of the frame. An optional reinforcing rib 33A (not shown in FIG. 1A) is shown extending integrally from the lower side of D-frame 13B such that the frame has a T-shaped cross section.

Figure 1D:
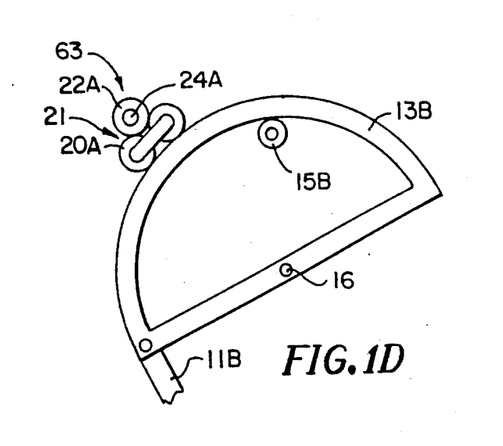
FIGS. 1D and 1E are front views of the D-frames used in the suspension of FIG. 1A.

FIG. 1D shows a front view of D-frame 13B. Transmission mechanism 63 in gripper 14B (FIG. 1A) is in rolling engagement with the upper surface of D-frame 13B, while roller 15B is in rolling engagement with the lower surface of the D-frame.

Figure 1E:
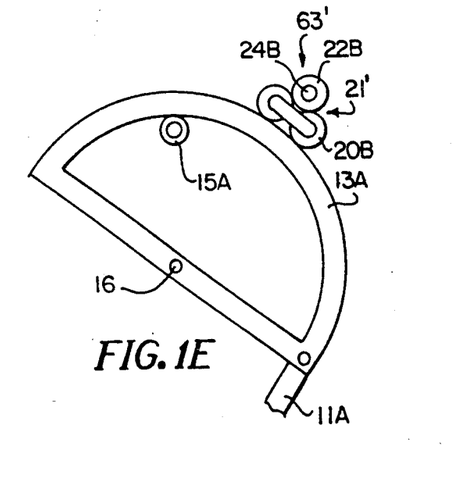

FIG. 1E shows a front view of D-frame 13A. Transmission mechanism 63' in gripper 14A (FIG. 1A) is in rolling engagement with the upper surface of D-frame 13A, while roller 15A is in rolling engagement with the lower surface of the frame.

Because D-frames 13A and 13B are rotatably connected by axle 16, their curved portions form parts of imaginary, concentric circles. Therefore, D-frame 13B is held and constrained directly by transmission mechanism 63 and roller 15B, and indirectly by resistance mechanism 63' and roller 15A; while D-frame 13A is held and constrained directly by resistance mechanism 63' and roller 15A; and indirectly by transmission mechanism 63 and roller 15B.

Figure 1F:
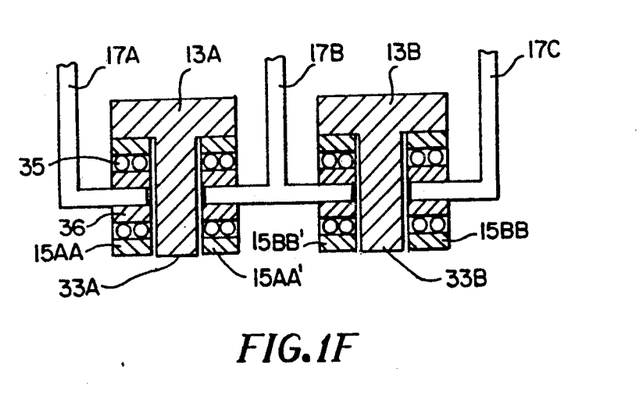
FIG. 1F is a right side sectional view of another embodiment of the rollers used in the suspension of FIG. 1A.

In lieu of rollers 15A and 15B (FIG. 1A), alternative rollers 15AA and 15BB can be provided as shown in FIG. 1F in a right side partial sectional view. These alternative rollers are narrower than rollers 15A and 15B (FIG. 1A). D-frames 13A and 13B are shown with optional reinforcing ribs 33A and 33B, respectively. Arms 17A and 17C are L-shaped, while arm 17B is in the shape of an inverted "T". The top or proximal ends of the arms are attached to the lower side of mounting plate 12 (FIG. 1A). Rollers 15AA and 15BB are disposed at the distal ends of arms 17A and 17C, respectively, such that they are in rolling engagement with the lower side of D-frames 13A and 13B, respectively. The optional "T" cross sections of the frames necessitate additional rollers 15AA' and 15BB' (not shown in FIG. 1A) to be disposed on the horizontal distal ends of arm 17B such that they are in rolling engagement with the lower surfaces of D-frames 13A and 13B, respectively. All the rollers have internal ball bearings 35 disposed around hubs 36.

Figure 2A:
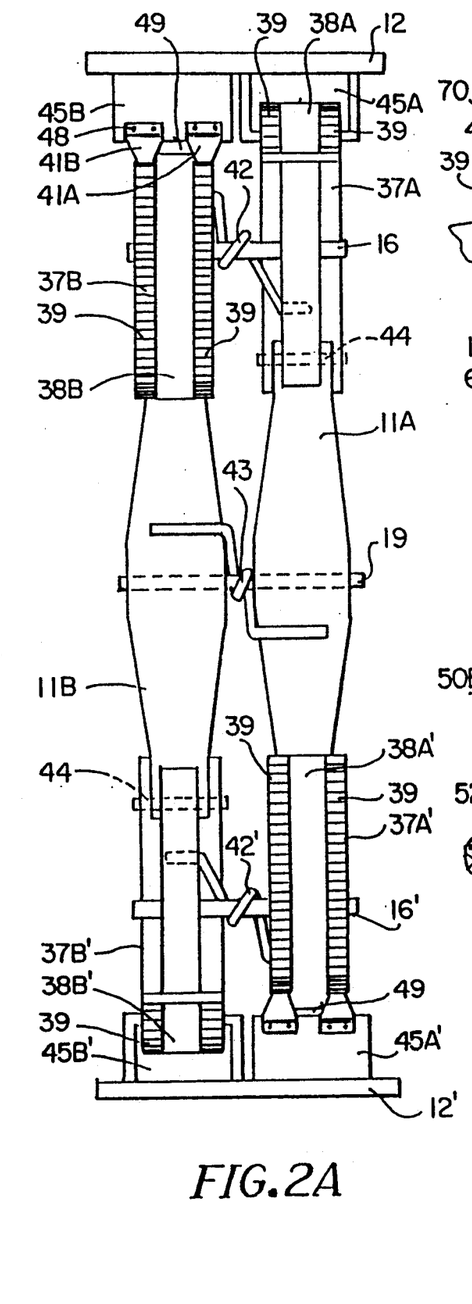
FIG. 2A is a left side view of a shock absorbing suspension in accordance with a second embodiment of the invention.

A second embodiment of the shock absorbing suspension is shown in FIG. 2A in a left side view. Mounting plates 12 and 12', connecting bars 11A and 11B, axle 19, and axles 16 and 16' are identical to those in the preferred embodiment shown in FIG. 1A.

D-frames 37A, 37B, 37A' and 37B' have smooth central grooves 38A, 38B, 38A' and 38B', respectively, running down the center of their curved outer surface. The grooves separate rows of teeth 39 on each D-frame. Levers 41, which are mounted on the outer sides of grippers 45A, 45B, 45A', and 45B', are urged by the engaging against teeth 39 of the D-frames in maintain the D-frames in position. Rollers 49 are disposed at the outer corners of the grippers, in rolling engagement with grooves 38, and will be explained later in connection with FIG. 2B.

Optional torsion springs 42 and 42' (not shown in FIG. 1A) are coiled around axles 16 and 16', respectively. The right distal ends of torsion springs 42 and 42' are anchored into the straight portions of D-frames 37A and 37A', respectively, and their left distal ends anchored into the straight portions of D-frames 37B and 37B', respectively. Springs 42 urge D-frames 37A and 37B to rotate about axle 16 CW and CCW, respectively, and D-frames 37A' and 37B' to rotate CW and CCW, respectively, as seen from the front of the suspension.

Optional torsion spring 43 (not shown in FIG. 1A), coiled around axle 19, has a left distal and anchored within connecting bar 11B and a right distal end anchored within connecting bar 11A. Spring 43 urges bars 11B and 11A to rotate about axle 19 CW and CCW, respectively, as seen from the front of the suspension. As a result, torsion springs 42, 42', and 43 cooperate together to help extend the suspension when it is not under load.

Figure 2B:
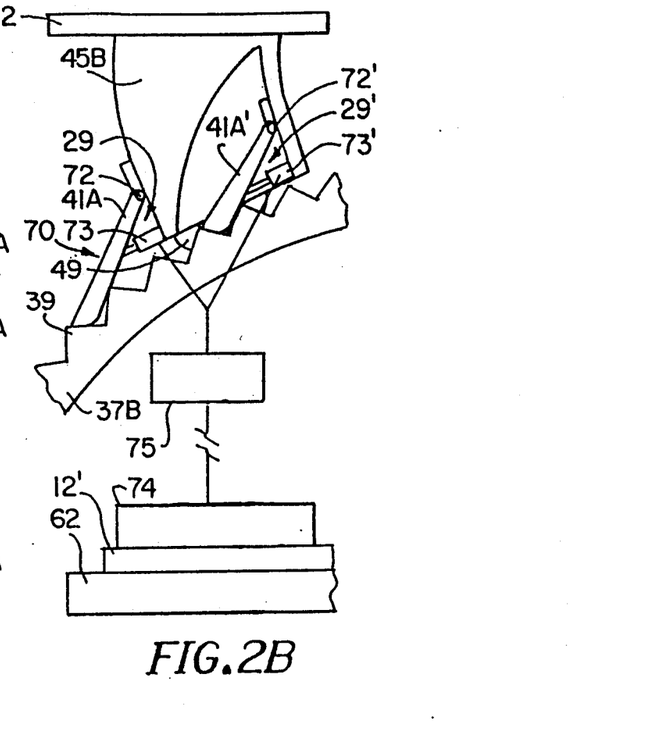
FIG. 2B is a right side view of a resistance mechanism used in the suspension of FIG. 2A.

FIG. 2B shows a resistance mechanism 70 is shown on the right side of FIG. 2A. A resistance mechanism includes a lever 41 (can be more than one) and a return mechanism 29. The lever is hingably attached to the gripper 45B by a hinge 72. Lever 41A is engaged with teeth 39 on D-frame 37B. Return mechanism can consist of a solenoid and accelerometer or a powerful spring, or an appropriate similar device. FIG. 2B presents a powerful, normally extended solenoid 73 (can be more than one) which has a housing attached to gripper 45B.

An accelerometer 74 attached to mounting plate 12' measures the force of the upwardly movement of supporting object 62. A power amplifier or solenoid driver 75 causes solenoid 73 to contract with a force directly proportional to the upwardly acceleration of supporting object 62, i.e., the greater the force of the upwardly movement of supporting object 62, the stronger solenoid 73 will contract to pull lever 41 against D-frame 37B. As a result, solenoid resistance mechanism 70 will resist the CW rotation of D-frame 37B with a force in proportion to the force of the upwardly movement of supporting object 62.

Figure 2C:
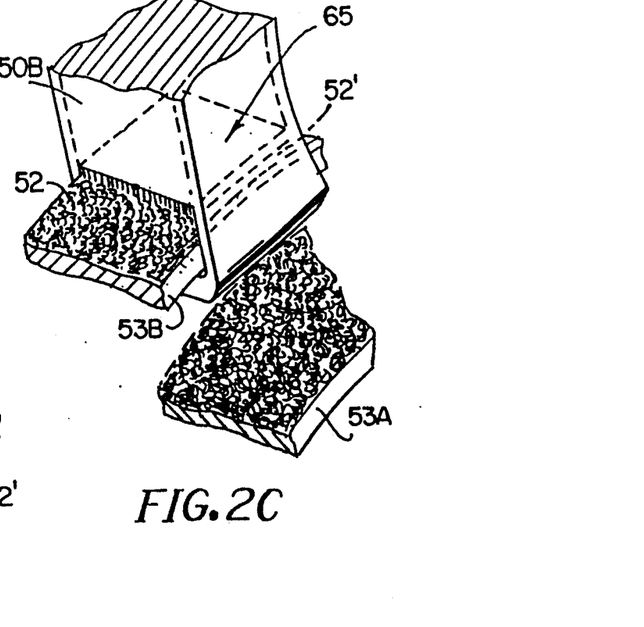
FIG. 2C is a front perspective view of another embodiment of the resistance mechanism of FIG. 2A.

FIG. 2C illustrates an alternative method of creating directional resistance for the D-frames. A D-frame 53B is slidably disposed within a gripper 50B having a square plate 51 mounted within. A piece of fabric 52 having stiff fibers matted down tightly and oriented in a CW direction is attached to the outer surface of the D-frame. Fabric 52 is similar to the type of material commonly used in lint brushes for clothing. A similar piece of fabric 52' is attached to the underside of plate 51, but with the fibers pointed in a CCW direction. D-frame 53B and plate 51 are positioned such that the pieces of fabric 52 and 52' are compressed therebetween. Because the stiff fibers of fabric 52 and 52' are oriented toward each other, they will cause D-frame 53B to strongly resist CW rotation, but be easily rotatable CCW.

Fabric 52 and 52', and square plate 51 comprise the resistance mechanism 65 for D-frame 53B. In this embodiment, other D-frames are similarly equipped with additional resistance mechanisms 65. Fabric 52 and 52' can be made of other materials such as fine metal bristles.

Figure 3A:
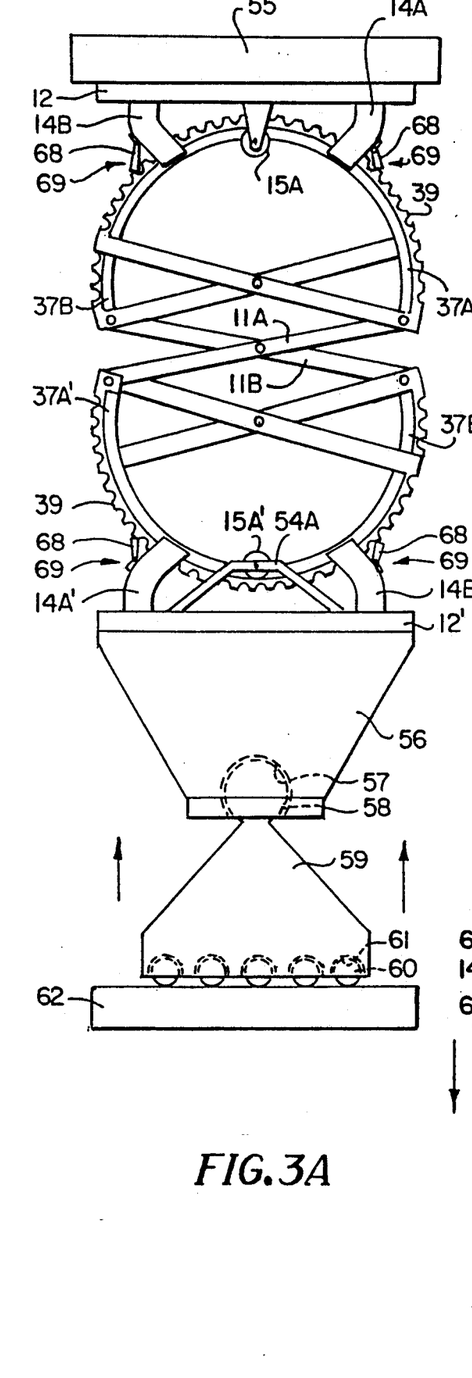
FIG. 3A is a front view of a third embodiment of the shock absorbing suspension, in full compression.

The shock absorbing suspension is shown in FIG. 3A in a third embodiment. Levers 68 are mounted on the outer side of grippers 14A, 14B, 14A', and 14B' for engaging teeth 39. Levers 68 and teeth 39 comprise resistance mechanism 69. Resistance mechanism 69 will resist and permit rotation of frames 37A, 37B, 37A', and 37B' in the manner described in FIG. 2B. A tapered adapter 56 is attached to the bottom of mounting plate 12'. The adapter has a spherical socket 57 in which the ball 58 of a conical base 59 is disposed. Several small ball bearings 60 are disposed in small sockets 61 on the bottom surface of base 59. Rollers 15A' and 15B' (FIG. 1A) are held by a pair of A-frames 54A and 54B (not shown), respectively, which are attached to mounting plate 12'.

Operation in Compression

The operation of all embodiments of the suspension are similar. The operation of the embodiment of FIG. 3A will be discussed here as an example. A load 55 is attached to the top of mounting plate 12. Load 55 can be anything the suspension can support and isolate from shock and vibrations, including the body of a motor vehicle, a building, etc. The entire suspension rests on top of a supporting object 62, which can be a foundation if load 55 is a building. In the case of a building, many suspensions should be installed at the main support points of the building, as shown in the previously cited building shock absorber patents. In the case of a motor vehicle, the suspension will be installed between the wheel's axles and the wheel wells, in place of the conventional suspension parts.

When load 55 and supporting object 62 are at rest, the amount of resistance offered by resistance mechanisms 69 are enough to prevent all D-frames 37 from rotating, and the suspension from being compressed. Therefore, the suspension is maintained in an intermediate position similar to that shown in FIGS. 1A and 2A. The amount of resistance offered by resistance mechanisms 69, or 63, 65, and 70, of the other embodiments of the suspension, are carefully chosen for each type of load 55. For example, the resistance should be less for relatively light loads such as motor vehicles, but much higher for very heavy loads such as buildings.

When foundation or supporting object 62 jolts upwardly during an earthquake, as indicated by the arrows, the compression exerted on the suspension by the inertia of load 55 and the force of the upward movement of supporting object 62 will overcome the resistance provided by resistance mechanisms 69. Therefore, supporting object 62 will force D-frames 37A and 37A' to rotate CCW, and D-frames 37B and 37B' to rotate CW. Connecting bar 11A will rotate CW, while connecting bar 11B will rotate CCW. As a result, the suspension will be compressed as shown in FIG. 3A. Since all the D-frames are rotated against their strong resistance, the suspension will resist the upward motion of object 62. The energy of object 62 being absorbed by springs 68. The inertia of load 55 will cause the load to remain relatively motionless, such that the load will be isolated from the upwardly movement of building foundation or supporting object 62. The stability and safety of load 55 is thus maintained. The other embodiments of the suspension shown in FIGS. 1A and 2A will experience compression in a similar manner.

Small ball bearings 60 will allow supporting object 62 or the building foundation to jolt or slide horizontally under base 59, such that load 55 is isolated from the horizontal motions of object 62. The joint between ball 58 and socket 57 will allow supporting object 62 and base 59 to swing about under adapter 56, so that load 55 is also isolated from swinging motions.

OPERATION IN EXTENSION

Figure 3B:
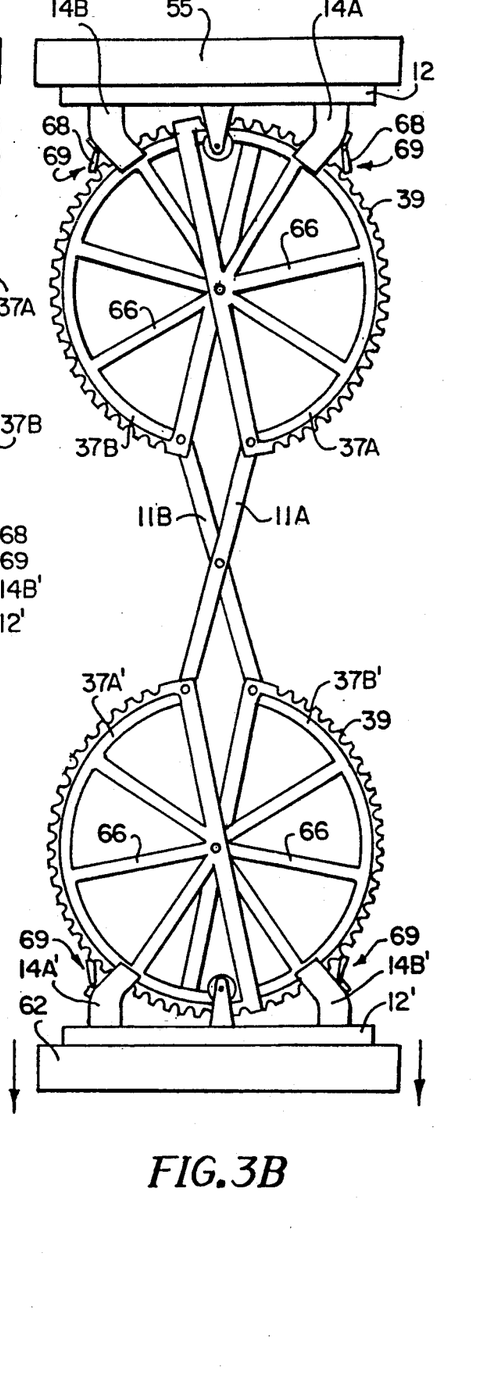
FIG. 3B is a front view of the shock absorbing suspension in full extension.

The suspension of FIG. 3B is shown here without adapter 56 and base 59, so that building foundation or supporting object 62 is attached directly to mounting plate 12'. All D-frames 37 are shown with optional reinforcing spokes 66.

When the foundation or supporting object 62 jolts downwardly, as indicated by the arrows, directional resistance mechanisms 69 will offer little resistance to allow D-frames 37A and 37A' to easily rotate CW, and D-frames 37B and 37B' to easily rotate CCW. Connecting bar 11A will rotate CCW, while connecting bar 11B will rotate CW. As a result, the suspension will be automatically and easily pulled by the downwardly moving supporting object 62 to the fully extended position shown. Torsion springs 42, 42', and 43 (FIG. 2A) will assist in extending the suspension, as described in FIG. 2A. The other embodiments of the suspension shown in FIGS. 1A and 2A will experience extension in a similar manner.

The suspension's cycles of compression and extension will repeat as long as supporting object 62 continues to jolt up and down. As a result, the suspension will reliably isolate load 55 from the jarring movements of supporting object 62 to ensure its stability and safety.

Figure 3C:
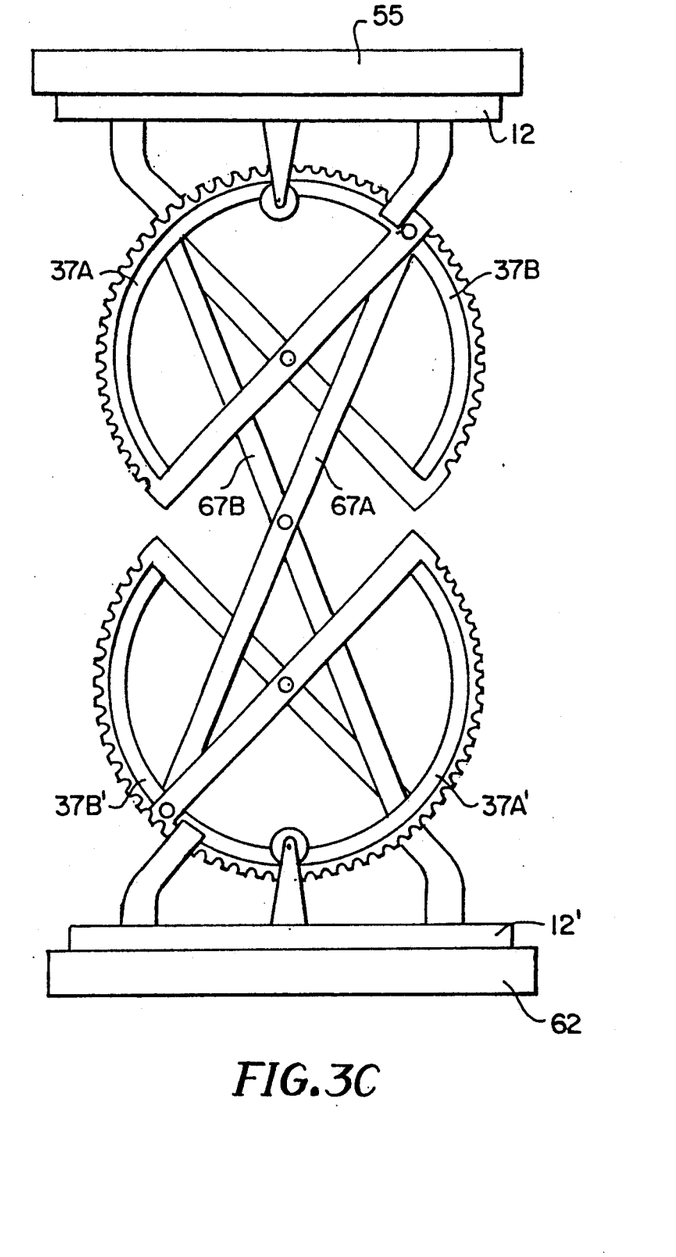
FIG. 3C is a front view of the shock absorbing suspension in accordance with a fourth embodiment of the invention.

The suspension of FIG. 3B is shown here without spokes 66 as a fourth embodiment. Long connecting bars 67A and 67B are fitted, such that when the suspension is fully compressed as shown, D-frames 37A and 37A' can be rotated further CCW, and D-frames 37B and 37B' can be rotated further CW than shown in FIG. 3A. As a result, the travel of the suspension is increased.

Accordingly, the reader will see that I have provided an improved shock absorbing suspension which can support the weight of an object above a supporting surface, which extends and contracts in a linear direction, which can isolate the object from small as well as very large displacements of the supporting surface, which can isolate the object from lateral as well as vertical displacements of the supporting surface, which singularly performs the functions of locating the supported object, absorbing the energy of the moving supporting surface, and dampening vibrations, and which can be made to support a variety of objects of different sizes, weight, and in different applications.

The above descriptions are specific, they should not be considered as limitations on the scope of the invention, but only as examples of the embodiments. Many other ramifications and variations are possible within the teachings of the invention. For example, load 55 can be the cabin of a boat, while supporting object 62 is the hull of the boat. The suspension can therefore isolate the cabin from the movements of the hull as the hull is tossed by rough seas. Many suspensions can be used together for supporting very large and heavy objects, such as buildings. Other types of directional resistance mechanisms can be used. The suspension can be used in many other applications where a load must be isolated from the movements of its supporting object. Thus, the reader is requested to determine the scope of the invention by the appended claims and their legal equivalents, and not by the examples given.

I claim:

1. A suspension, comprising:
   a pair of mounting means spaced apart by a variable distance, such that said pair of mounting means can be compacted together or extended apart,
   a first pair of semi-circular frames positioned between said pair of mounting means, said first pair of semi-circular frames being concentrically and rotatably mounted about a first axis,
   a second pair of semi-circular frames positioned between said pair of mounting means, said second pair of semi-circular frames being concentrically and rotatably mounted about a second axis,
   gripping means attached to said pair of mounting means for slidably gripping said first and said second pairs of semi-circular frames, and connecting means connecting said first and said second pairs of semi-circular frames, such that when said distance between said pair of mounting means is varied, said connecting means will cause said first pair of semi-circular frames to counterrotate about said first axis, and said second pair of semi-circular frames to counterrotate about said second axis.

2. The suspension of claim 1, further including directional resistance means for resisting said counterrotation of all of said semi-circular frames such that said pair of mounting means will substantially resist being compacted together, but can be easily extended apart.

3. The suspension of claim 2 wherein said directional resistance means comprises a plurality of toothed segments on all of said semi-circular frames, a plurality of toothed rollers attached to said gripping means and a plurality of bogies having transmission elements compressed between each of said semi-circular frames and said toothed rollers, said toothed rollers being adapted to be in rolling engagement with said transmission elements, said transmission elements being adapted to be in rolling engagement with said tooth segments of said semi-circular frames.

4. The suspension of claim 2 wherein said directional resistance means comprises a plurality of resilient members compressed between each of said semi-circular frames and said gripping means for substantially resisting rotation of each of said semi-circular frames in one direction only.

5. The suspension of claim 2 wherein said directional resistance means comprises a plurality of toothed segments on all of said semi-circular frames, a plurality of hinged levers attached to said gripping means for engaging said toothed segments, and a plurality of return mechanisms for pulling said hinged levers against said toothed segments for substantially resisting rotation of each of said semi-circular frames in one direction only.

6. The suspension of claim 5 further including an accelerometer and an amplifier for energizing solenoid with a power in proportion to an external force applied to said suspension.

7. The suspension of claim 1, further including a spring disposed about each of said axes for urging said counterrotation of all of said semi-circular frames such that said pair of mounting means will be urged apart.

8. The suspension of claim 1 wherein said gripping means comprises a plurality of grippers for slidably gripping all of said semi-circular frames, each of said grippers having a plurality of rollers disposed within for rotatably engaging one of said semi-circular frames.

9. A suspension, comprising:
first and second mounting means spaced apart by a variable distance, such that said first and said second mounting means can be compacted together or extended apart,
first and second semi-circular frames positioned between said first and second mounting means, said first and said second semi-circular frames each having a first end, a second end, a curved side therebetween, and a common first axis, said first and said second semi-circular frames being concentrically and rotatably mounted about said first axis, said curved sides of said first and said second semi-circular frames being positioned generally adjacent said first mounting means,
third and fourth semi-circular frames positioned between said first and said second mounting means, said third and said fourth semi-circular frames each having a first end, a second end, a curved side therebetween, and a common second zxis, said third and said fourth semi-circular frames being concentrically and rotatably mounted about said second axis, said curved sides of said third and said fourth semi-circular frames being positioned generally adjacent said second mounting means, said first end of said third semi-circular frame being positioned diagonally from said first end of said first semi-circular frame, said first end of said fourth semi-circular frame being positioned diagonally from said first end of said second semi-circular frame,
gripping means attached to said first and said second mounting means for slidably gripping said curved sides of all of said semi-circular frames,
first and second connecting means, said first connecting means connecting said first end of said third semi-circular frame diagonally with said first end of said first semi-circular frame, said second connecting means connecting said first end of said fourth semi-circular frame diagonally with said first end of said second semi-circular frame, such that when said distance between said first and said second mounting means is varied, said first and said second connecting means will cause said first and said second semi-circular frames to counterrotate about said first axis, and said third and said fourth semi-circular frames to counterrotate about said second axis, and
directional resistance means for resisting said counterrotation of all of said semi-circular frames such that said first and said second mounting means will substantially resist being compacted together, but can be easily extended apart.

10. The suspension of claim 8 wherein said directional resistance means comprises a plurality of toothed segments on an outer surface of said curved side of each of said semi-circular frames, and a plurality of toothed rollers attached to said gripping means and plurality bogies having transmission elements compressed between each of said semi-circular frames and said rollers, said rollers being adapted to be in rolling engagement with said transmission elements said transmission elements being adapted to be in rolling engagement with said toothed segments of said semi-circular frames.

11. The suspension of claim 10 wherein said directional resistance means comprises a plurality of resilient members compressed between each of said semi-circular frames and said gripping means for substantially resisting rotation of each of said semi-circular frames in one direction only.

12. The suspension of claim 9 wherein said directional resistance means comprises a plurality of toothed segments on all of said semi-circular frames, a plurality of hinged levers attached to said gripping means for engaging said toothed segments, and return mechanism for pulling said hinged levers against said toothed segments for substantially resisting rotation of each of said semi-circular frames in one direction only.

13. The suspension of claim 12 further including an accelerometer and an amplifier for energizing said solenoid with a power in proportion to an external force applied to said suspension.

14. The suspension of claim 9 further including a spring disposed about each of said axes for urging said counterrotation of all of said semi-circular frames such that said first and said second mounting means will be urged apart.

15. The suspension of claim 9 wherein said gripping means comprises a plurality of grippers for slidably gripping said curved sides of said semi-circular frames, each of said grippers having a first roller disposed within for rotatably engaging an outer surface of said curved side of one of said semi-circular frames, and a second roller spaced from said first roller and adapted to be in rolling engagement with an inner surface of said curved side of one of said semi-circular frames.

16. The suspension of claim 9, further including a third mounting means attached to said second mounting means by a ball-and-socket joint.

17. The suspension of claim 16, further including a plurality of bearings disposed under said third mounting means.

18. A suspension, comprising:

first and second mounting means spaced apart by a variable distance, such that said first and said second mounting means can be compacted together or extended apart, first and second semi-circular frames positioned between said first and said second mounting means, said first and said second semi-circular frames each having a first end, a second end, a curved side therebetween, and a common first axis, said first and said second semi-circular frames being concentrically and rotatably mounted about said first axis, said curved sides of said first and said second semi-circular frames being positioned generally adjacent said first mounting means, third and fourth semi-circular frames positioned between said first and said second mounting means, said third and said fourth semi-circular frames each having a first end, a second end, a curved side therebetween, and a common second axis, said third and said fourth semi-circular frames being concentrically and rotatably mounted about said second axis, said curved sides of said third and said fourth semi-circular frames being positioned generally adjacent said second mounting means, said first end of said third semi-circular frame being positioned diagonally from said first end of said first semi-circular frame, said first end of said fourth semi-circular frame being positioned diagonally from said first end of said second semi-circular frame, a plurality of grippers attached to said first and said second mounting means for slidably gripping said curved sides of all of said semi-circular frames, each of said grippers having a first roller disposed within for rotatably engaging an outer surface of said curved side of one of said semi-circular frames, and a second roller spaced from said first roller and placed in rolling engagement with an inner surface of said curved side of one of said semi-circular frames, first and second connecting means, said first connecting means connecting said first end of said third semi-circular frame diagonally with said first end of said first semi-circular frame, said second connecting means connecting said first end of said fourth semi-circular frame diagonally with said first end of said second semi-circular frame, such that when said distance between said first and said second mounting means is varied, said first and said second connecting means will cause said first and said second semi-circular frames to counterrotate about said first axis, and said third and said fourth semi-circular frames to counterrotate about said second axis, directional resistance means for resisting said counterrotation of all of said semi-circular frames such that said first and said second mounting means will substantially resist being compacted together, but can be easily extended apart, and a spring disposed about each of said axes for urging said counterrotation of all of said semi-circular frames such that said first and said second mounting means will be urged apart.

19. The suspension of claim 18 wherein said directional resistance means comprises a plurality of toothed segments on all of said semi-circular frames, a plurality of hinged levers attached to said gripping means for engaging said toothed segments, and return mechanism for pulling said hinged levers against said toothed segments for substantially resisting rotation of each of said semi-circular frames in one direction only.

20. The suspension of claim 19, further including an accelerometer and an amplifier for driving said solenoid with a power in a proportion to an external force applied to said suspension.

21. The suspension of claim 18, further including a third mounting means attached to said second mounting means by a ball-and-socket joint.

22. The suspension of claim 21, further including a plurality of bearings disposed under said third mounting means.

* * * * *